UNITED STATES PATENT OFFICE.

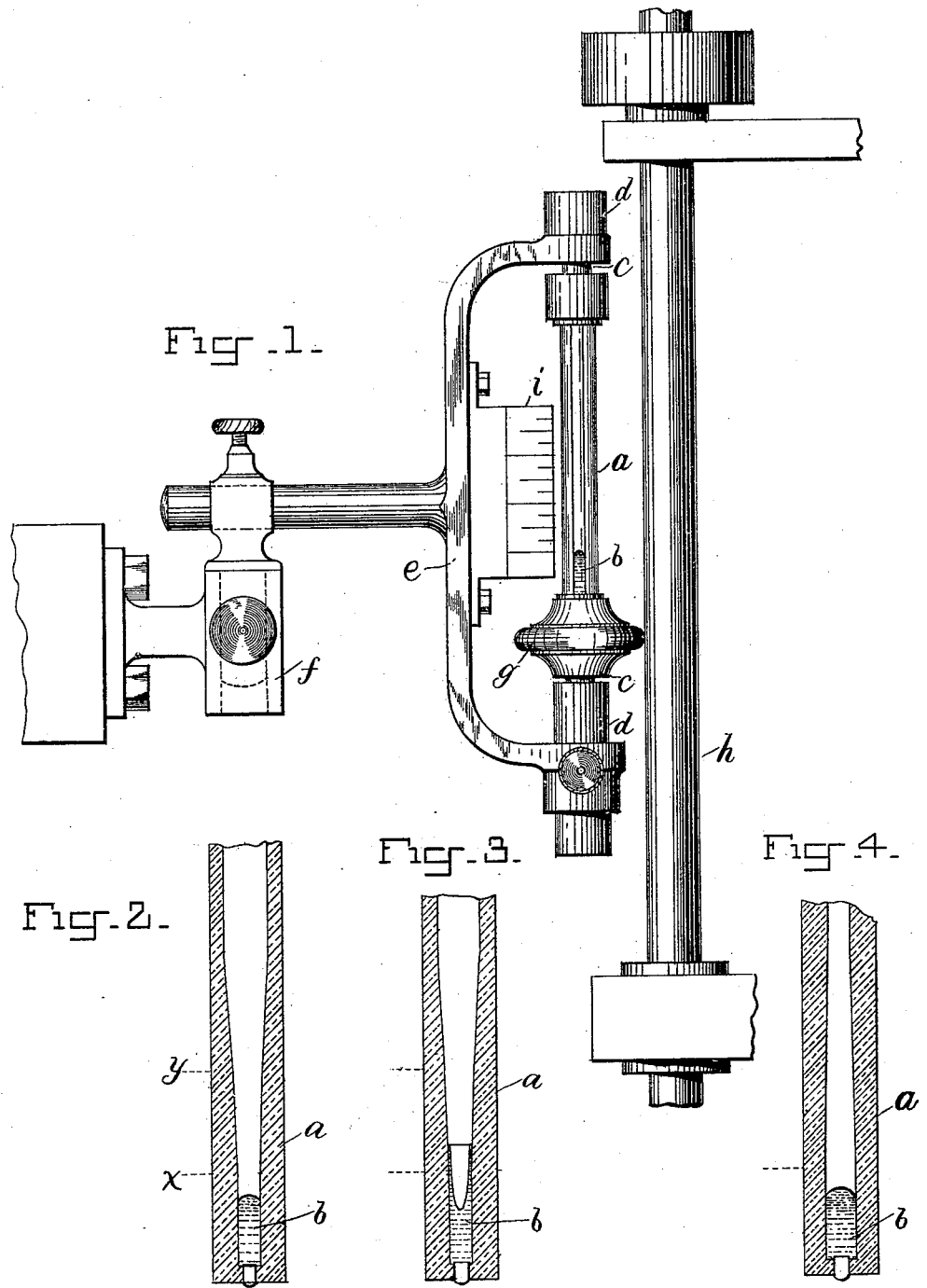

FREDERICK HART, OF POUGHKEEPSIE, NEW YORK.

SPEED-INDICATOR FOR SHAFTING.

SPECIFICATION forming part of Letters Patent No. 512,960, dated January 16, 1894.

Application filed March 24, 1892. Serial No. 426,188. (No model.)

*To all whom it may concern:*

Be it known that I, FREDERICK HART, a subject of the Queen of Great Britain, and a resident of Poughkeepsie, in the county of Dutchess and State of New York, have invented a certain new and useful Improved Speed-Indicator, of which the following is a specification.

My invention relates to that class of speed indicators or gages, which are provided with a vertical rotatory glass tube which contains a column of liquid and which indicates the speed by the position of the surface of the liquid, which position varies at different speeds, by reason of the different effects of centrifugal force at different speeds.

The object of my invention is to render the indicator more sensitive to changes of speed, and more convenient for use.

In the accompanying drawings:—Figure 1 is a side elevation of my improved indicator and part of a rotating spindle, showing the application of the indicator thereto in use. Fig. 2 is a vertical section of the lower part of the glass tube, on an enlarged scale, showing the bore of the tube flaring upwardly, and the mercury in the tube in the position which it assumes when the tube is at rest. Fig. 3 is a similar section showing the mercury in the position which it assumes when the tube is in motion. Fig. 4 is the vertical section of the lower part of a tube which tapers upwardly.

Like letters of reference refer to like parts in the several figures.

$a$ represents the glass tube of the indicator, closed at the ends and containing a short column $b$ of mercury which fills the tube partly, the rest of the bore being filled with air, preferably at normal pressure. The tube is mounted vertically on pivots $c$ arranged in bearings $d$ which permit the tube to rotate freely. These bearings are attached to a swinging bracket $e$ pivoted in a support $f$, so that the indicator can be swung to and from the shaft, spindle or other rotating part $h$, the speed of which is to be ascertained. The tube is provided with a friction wheel $g$ which, upon being brought in contact with the rotating part, rotates the tube. The rotation of the tube subjects the mercury to centrifugal action, which causes the mercury to rise along the surface of the bore of the tube in proportion as it is displaced from the center of the column. This change of position of the surface of the mercury is read off on a vertical scale $i$ which is secured to the bracket near the glass tube. This scale reads upwardly and begins on a level with the surface of the mercury when the tube is at rest, or at the point indicating the minimum speed, or at such other point as may be desirable, and extends upwardly and above the column of mercury, so that the upper edge of the parabolic surface of the mercury is used for indicating the speed and not the apex of the parabola, as heretofore proposed. The upper edge of the parabolic surface of the mercury is well defined and easily observed, and has a considerable vertical range of movement, so that comparatively small variations of speed can be noticed, while the apex of the parabola is not clearly visible and has a much smaller vertical range of movement.

In Fig. 1, the bore of the glass tube is shown cylindrical which is suitable for medium speeds. For a larger range of variation and comparatively slow speeds, the bore is preferably flared upwardly along that portion over which the surface ranges between minimum and maximum speeds, as represented in Fig. 2, say from $x$, where the top edge of the mercury stands at minimum speed, to $y$, which it reaches at maximum speed. From $y$ upwardly the bore may have a still greater flare for causing a more rapid ascent and more conspicuous indication, more likely to attract attention when the speed is too high. For very high speeds in which the range of the mercury would be unnecessarily large and the top edge of the parabola not so clear and well defined, the bore of the tube is preferably tapered upwardly, as represented in Fig. 4, whereby the rise of the top of the column is retarded and the column is contracted at the top and rendered more conspicuous.

In Figs. 1, 2 and 4 the liquid column $b$ is represented in the position of rest, the top being considerably below the point $x$, which represents the position of the top at minimum speed. The tube may be flared from the position of the top of the liquid column at rest, or from the bottom upward, if preferred.

Instead of rotating the tube by a friction wheel running in contact with the rotating part, it may be rotated by a pulley driven by a belt from the rotating part. This is preferable when the rotating part has its axis arranged horizontally. The proportions of the parts by which the tube is rotated have to be taken into account in graduating the scale.

As mercury is a very heavy liquid, the bore of the tube can be made much smaller than when a lighter liquid is used, while the top edge is easily observed owing to the opaque character of the liquid.

I claim as my invention—

1. In a speed indicator, the combination with a transparent vertical rotary tube, an opaque liquid column contained therein and adapted to rise in said tube with its upper surface in parabolic form, when rotary motion is imparted to said tube, and a scale arranged along the tube containing said liquid and opposite the range of movement of the parabolic surface of the liquid, substantially as described.

2. In a speed indicator, the combination with a vertical transparent rotatory tube containing a column of liquid, of a horizontally swinging bracket provided with supports on which said tube is rotated, substantially as set forth.

3. In a speed indicator, the combination with a vertical transparent rotatory tube containing a column of liquid, of a friction wheel secured to said tube, and a horizontally swinging bracket provided with supports on which said tube is rotated, substantially as set forth.

Signed at New York, in the county of New York and State of New York, this 5th day of February, A. D. 1892.

FREDERICK HART.

Witnesses:
W. J. MORGAN,
W. B. EARLL.